Figure 3:
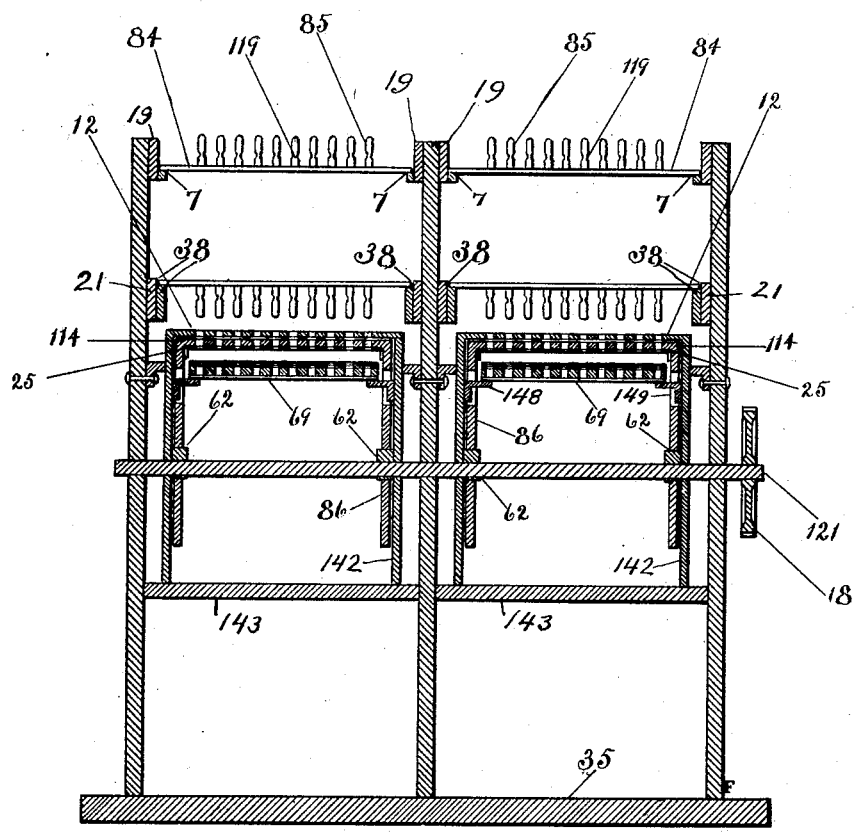

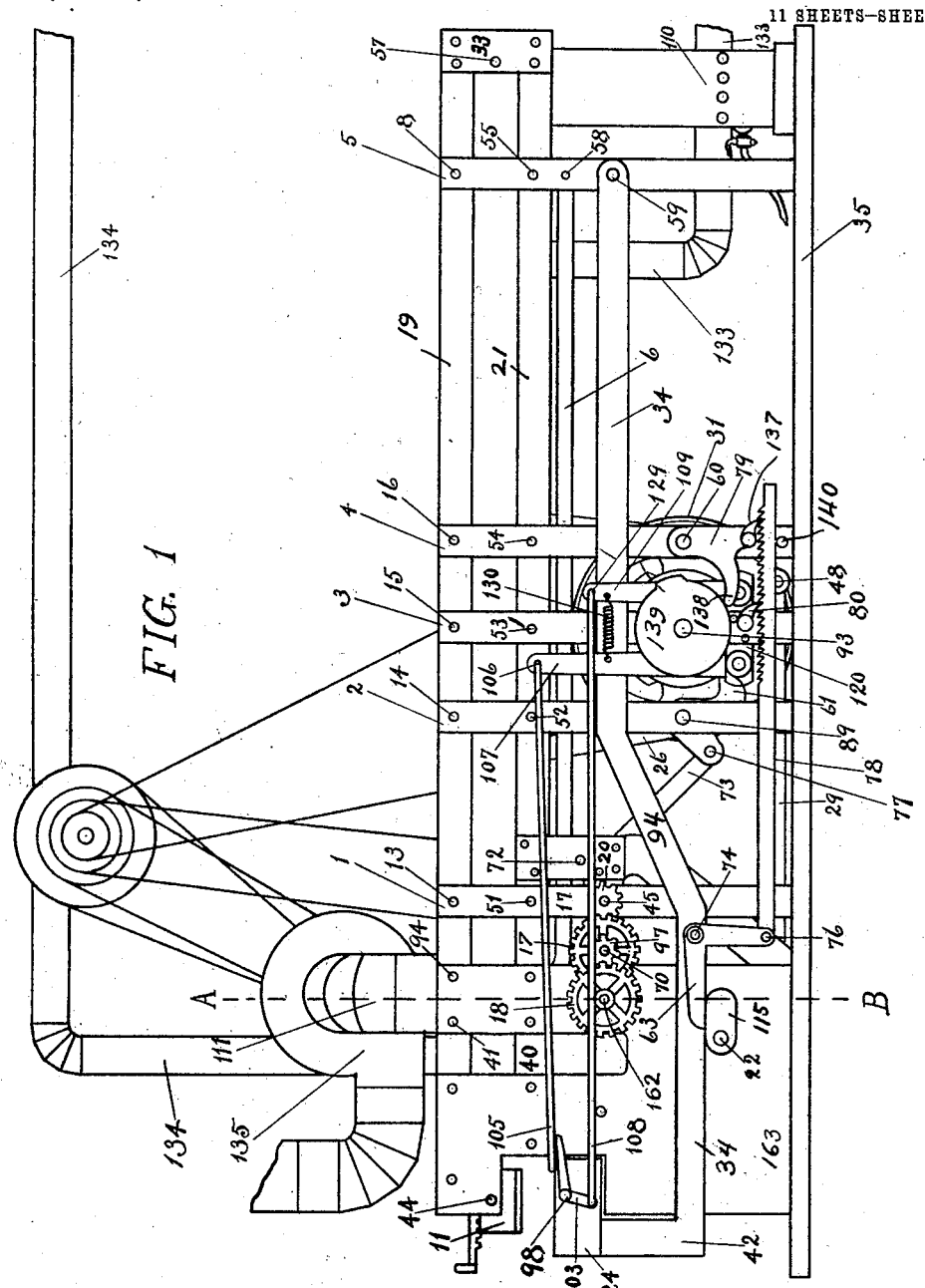

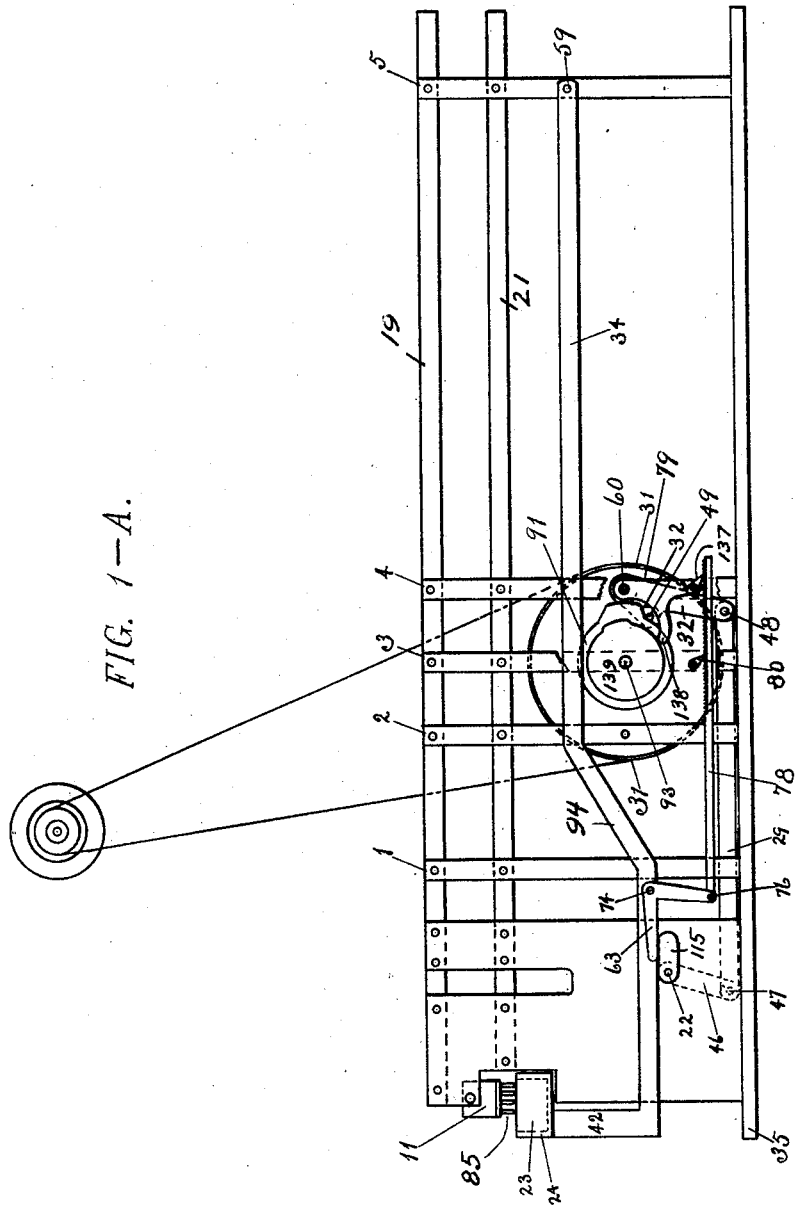

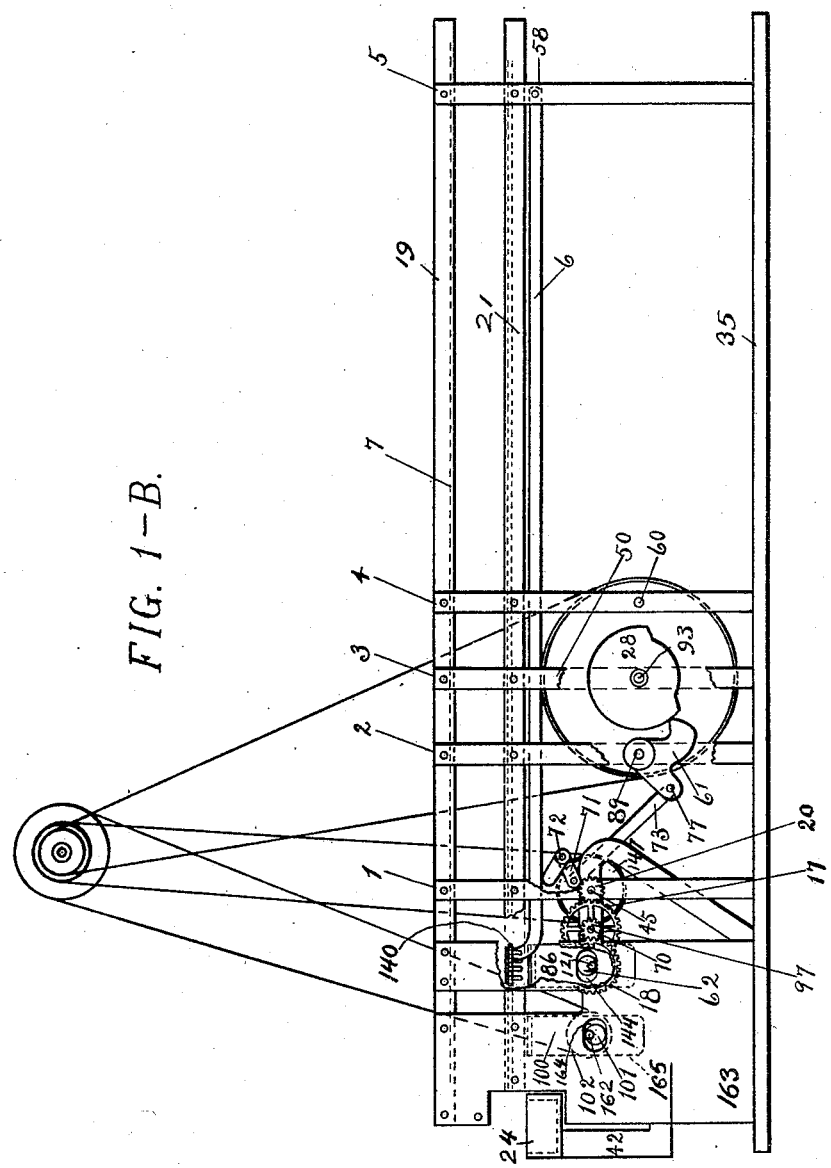

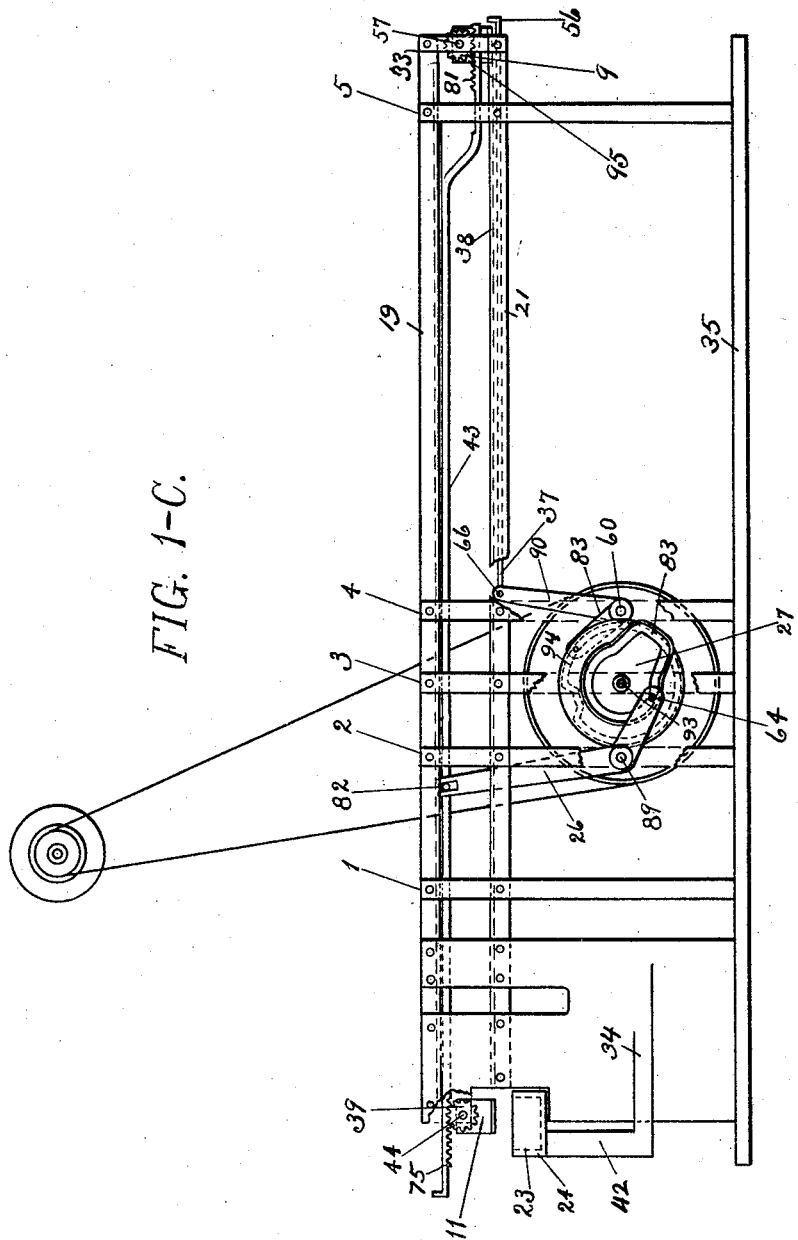

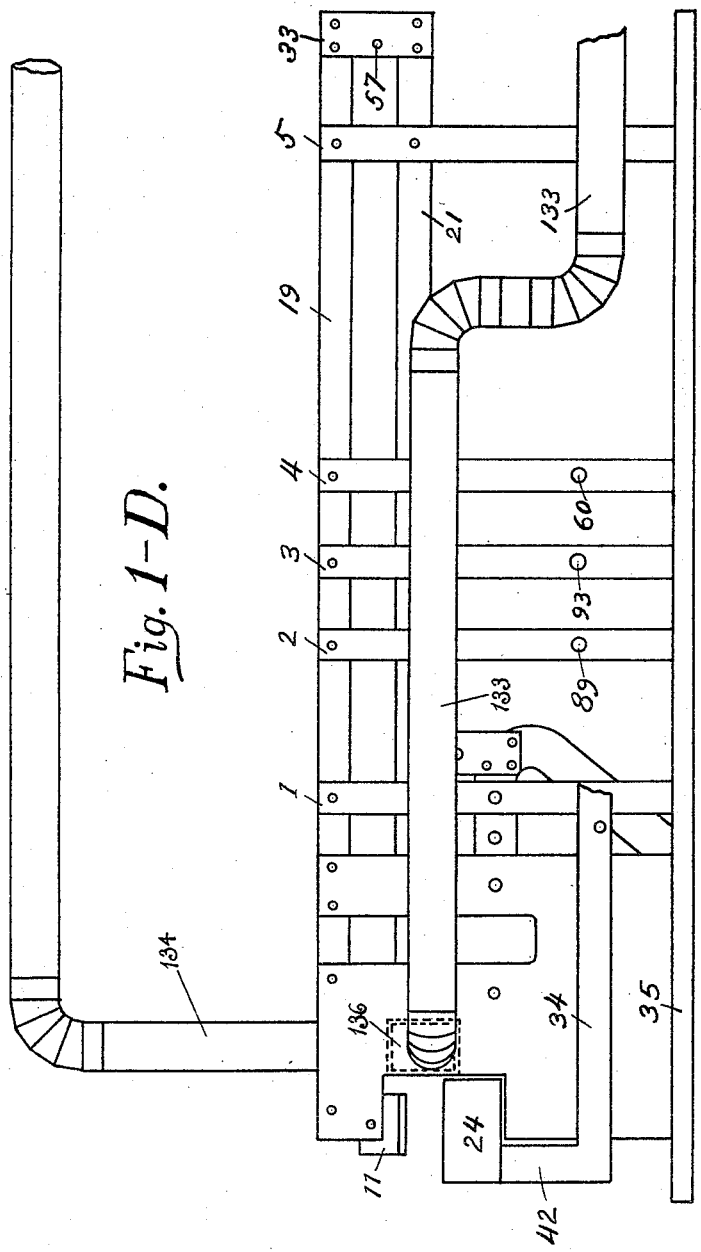

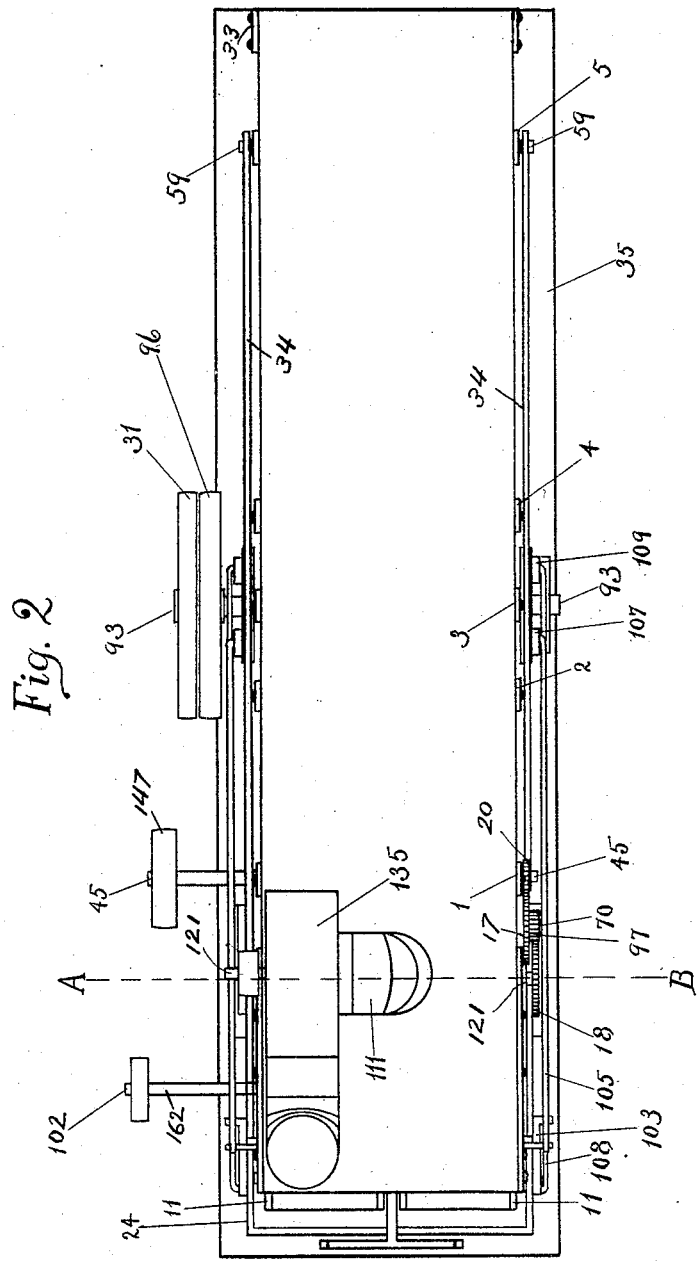

B. T. WINCHESTER.
CAPSULE MACHINE.
APPLICATION FILED JUNE 15, 1908.

1,114,325.

Patented Oct. 20, 1914.
11 SHEETS—SHEET 7.

B. T. WINCHESTER.
CAPSULE MACHINE.
APPLICATION FILED JUNE 15, 1908.

1,114,325.

Patented Oct. 20, 1914.
11 SHEETS—SHEET 8.

FIG. 4.

Benjamin Thomas Winchester
Inventor

BY

Witnesses
Benjamin Franklin
Sam'l M. Friedmann

William W. Varney
Attorney

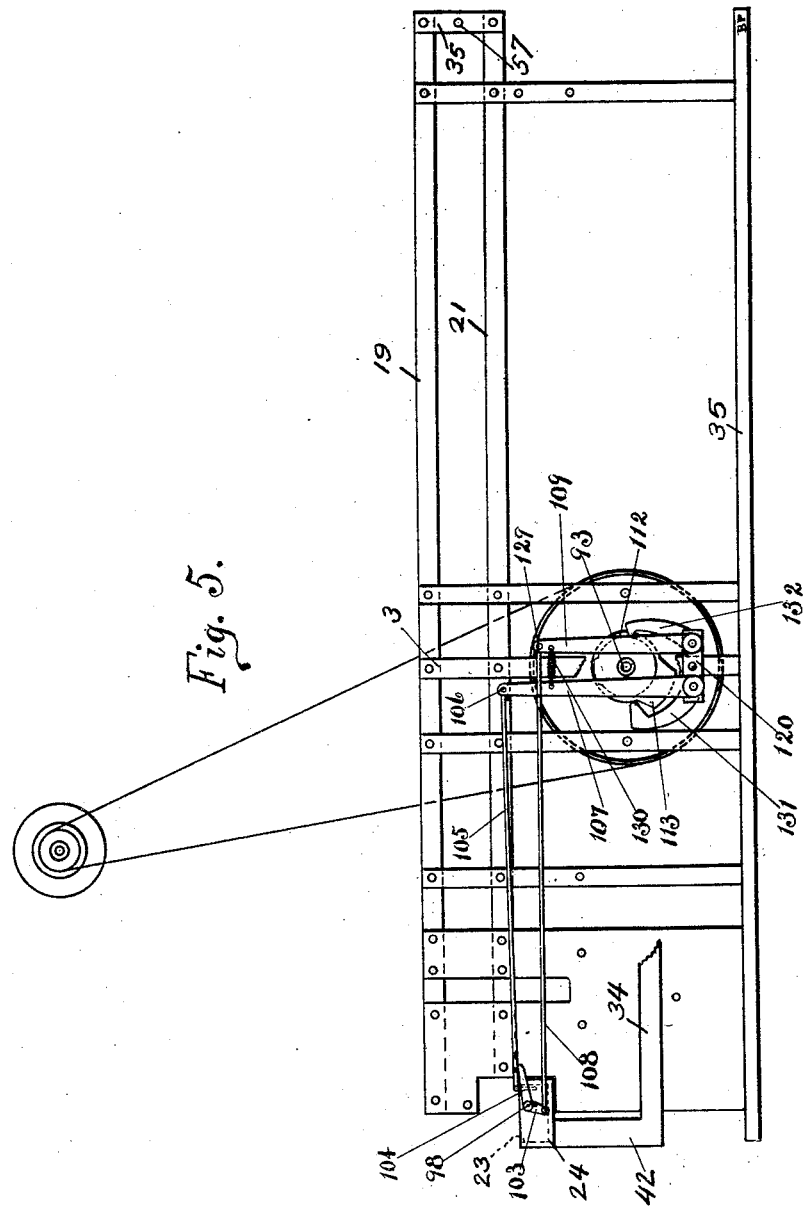

B. T. WINCHESTER.
CAPSULE MACHINE.
APPLICATION FILED JUNE 15, 1908.
1,114,325.
Patented Oct. 20, 1914.
11 SHEETS—SHEET 10.
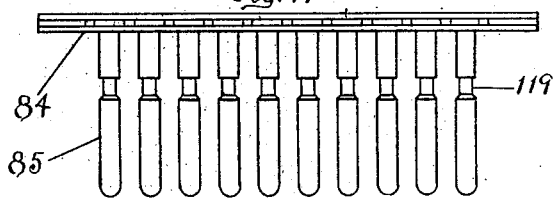
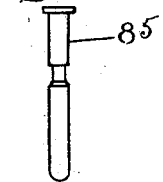
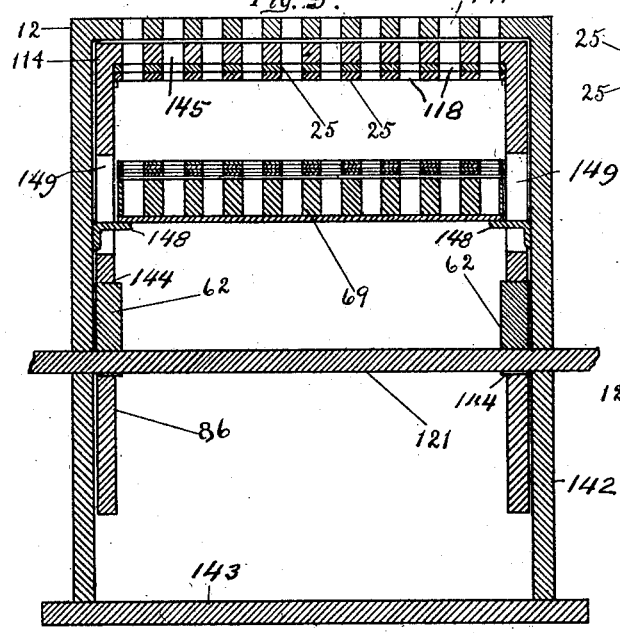
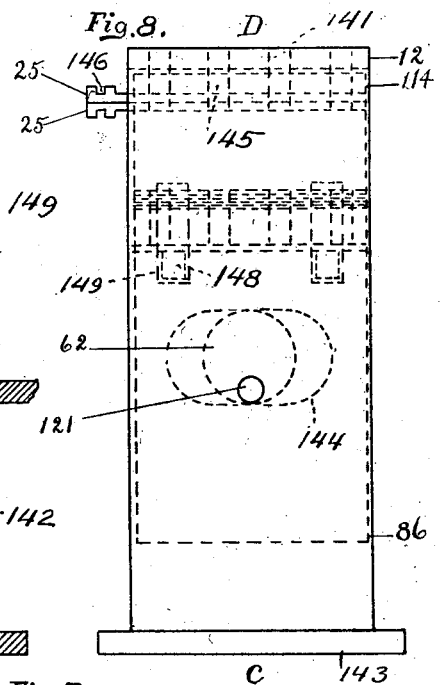
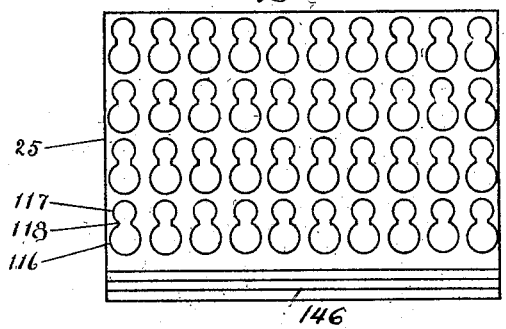
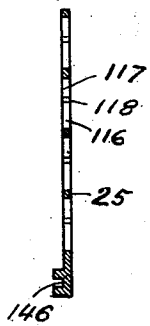
Witnesses
Benjamin Franklin.
Sam'l M. Friedmann.
Inventor
Benjamin Thomas Winchester
By
William W. Varney   Attorney

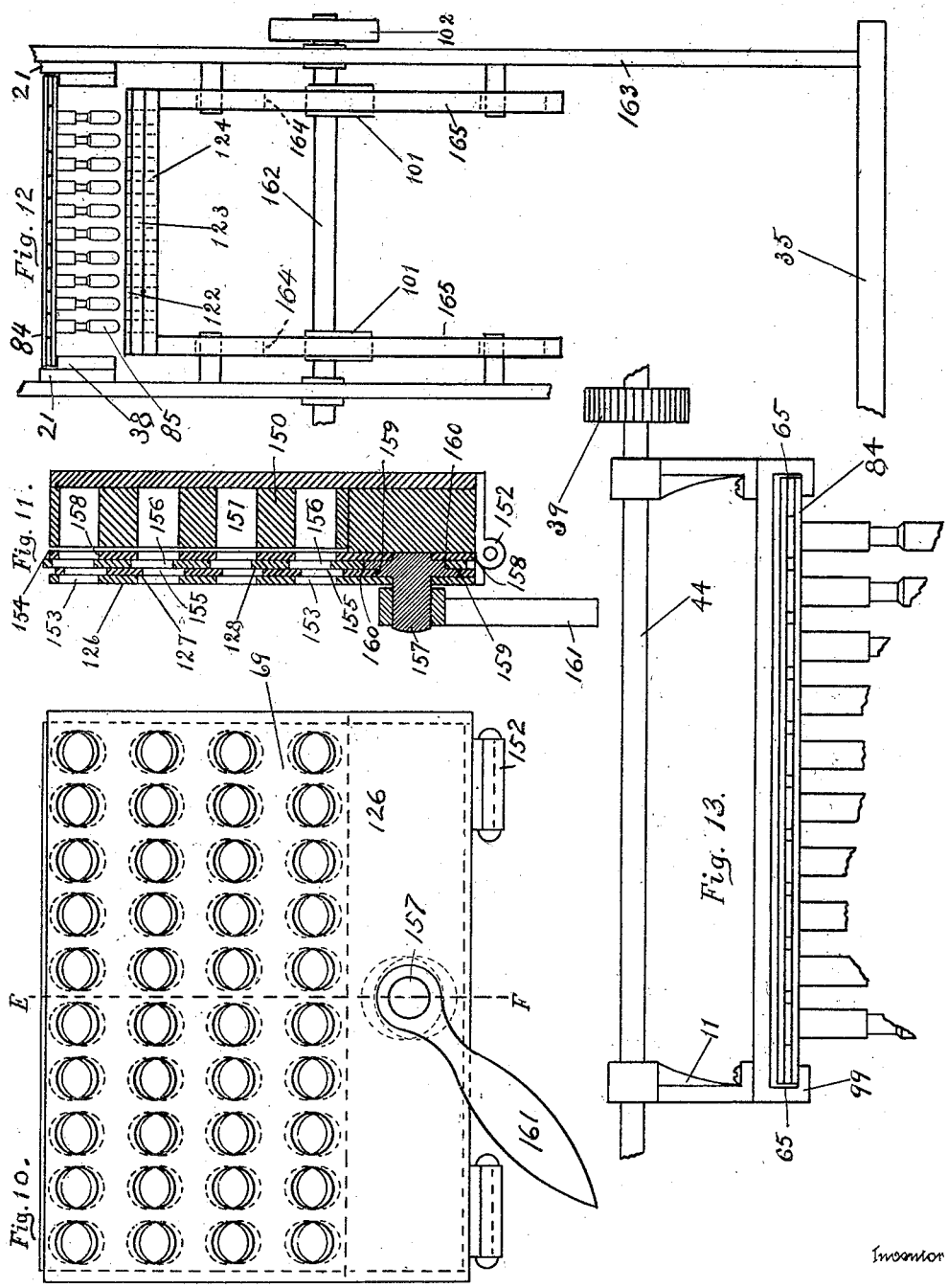

UNITED STATES PATENT OFFICE.

BENJAMIN THOMAS WINCHESTER, OF WINDSOR HILLS, MARYLAND, ASSIGNOR, BY MESNE ASSIGNMENTS, TO SHARP AND DOHME, OF BALTIMORE, MARYLAND, A CORPORATION OF NEW JERSEY.

CAPSULE-MACHINE.

1,114,325.            Specification of Letters Patent.      Patented Oct. 20, 1914.

Application filed June 15, 1908. Serial No. 438,531.

*To all whom it may concern:*

Be it known that I, BENJAMIN THOMAS WINCHESTER, a citizen of the United States, residing at Windsor Hills, in the county of Baltimore, in the State of Maryland, have invented a new and useful Capsule-Machine, of which the following is a specification.

This invention relates to improvements in machinery for making capsules and has for its object to provide improved means for stripping the formed capsules from the dipping pegs before cutting the capsules; the stripping of the capsules into receivers before cutting the same; the cooling of the dipping pegs before dipping them into the gelatin; the automatic regulation of the gelatin bath with respect to the dip of the pegs and the stripping of the capsules from the dipping pegs automatically.

The accompanying drawings illustrate the invention, wherein,

Figure 1 shows a side elevation of a machine embodying features of the invention. Fig. 1^A, is a detail elevation,—parts being removed to show the devices for regulating the bath with respect to the dipping pegs.

Fig. 1^B shows another side elevation; parts being removed and other parts broken away to particularly illustrate the means for stripping and polishing the pegs. Fig. 1^C, illustrates another side elevation of the machine to particularly show the peg-inverting and carrying-mechanism. In this view parts are also omitted and broken away to bring into view the particular mechanism it is desired to illustrate. Fig. 1^D, is another side view of the machine to illustrate the arrangement of cooling pipes. Fig. 2 is a top plan view of the machine. Fig. 3, is a vertical cross-section through the machine on the lines A—B of Figs. 1 and 2. Fig. 4, shows another side elevation of the machine to illustrate the mechanism that operates the pinch plate. Fig. 5, is a similar view illustrating the mechanism that operates the skimming device. Fig. 6, is a detail plan view of the pinch plate. Fig. 7, is a sectional view of the same. Fig. 8, is a side elevation of the lifting table. Fig. 9, is a vertical cross-sectional elevation of the same,—the section being taken on the lines C—D of Fig. 8. Fig. 10, is a plan view of the receiver. Fig. 11, is a vertical cross-sectional view of the same,—this section being taken on the line E—F of Fig. 10. Fig. 12, shows an end elevation of the peg-cleaning devices. Fig. 13, is a view in elevation of the tilting plate which carries the peg plates. Fig. 14, shows one of the peg-carrying plates with the pegs therein, and Fig. 15, is a detail view showing one of the pegs detached.

Referring to the drawings, the numeral, 35, designates the main base plate on which the entire machine is supported and above which the uprights 1, 2, 3, 4 and 5, project. The upper ends of these uprights sustain spaced-apart horizontal supports, 19, which carry horizontal upper tracks, 7, and a similar arrangement of horizontal supports, 21, sustain lower horizontal tracks, 38. Suitable bolts, 13, 14, 15, 16, and, 8, secure the uprights and upper support and other bolts, 51, 52, 53, 54, and, 55, secure the lower support to said uprights. At the rear end the upper supports, 19, at one side and the lower supports, 21, at the opposite side are connected by vertically-extending side plates, 33, which form brackets or bearings for a horizontal shaft, 57. At the front end the side plates of the machine sustain a horizontal shaft, 44. These two horizontal shafts have positions midway between the upper tracks, 7, and the lower tracks, 38, so that suitable transfer mechanism may be carried by these shafts to effect a transferral and reversal of certain peg plates from the lower to the upper tracks at the front end and from the upper to the lower tracks at the rear end.

By reference to Figs. 1, 1^C and 13, of the drawings, it will be noted that horizontal shaft, 44, at the front ends of the horizontal tracks, is provided with spaced-apart bracket plates, 11, which are rigid with the shaft. These plates, 11, are connected by a transfer table, 99, that has side grooves, 65, which receive the opposite edges of the peg-plates, presently to be described. The plates, 11, and table, 99, are rigid with respect to the shaft, 44, so that when said shaft is oscillated the table, 99, will be swung through an arc of a circle so that the grooves, 65, will be brought into register with either the upper set of rails, 7, or the lower set of rails, 38, as the case may be. To oscillate the shaft, 44, the latter is provided with a pinion, 39, which is actuated by a rack-bar, 43, as will presently be explained. At the rear end of the machine the horizontal shaft, 57, carries another transfer table, 95, which is also sustained by spaced-apart plates similar to the plates, 11, at the front end. This rear shaft, 57, carries a pinion, 9, so that by oscillating the pinion, the table, 95, at the rear ends of the tracks will be swung through an arc and be brought into register with either the upper or lower tracks.

The operation of the table, 99, at the front and of the table, 95, at the rear is effected simultaneously and by means of the rack bar, 43. By reference to Fig. 1$^c$ it will be seen that this rack bar has a rack portion, 75, on the under side at the front end which meshes with the pinion, 39, on the rock shaft, 44, and at the rear end said rack bar curves downwardly and projects beneath the pinion, 9, on the rear horizontal shaft, 57, and has a rack portion, 81, on its upper surface at said rear end which engages said pinion, 9. A pin, 82, projects from the rack-bar and is engaged by the upper slotted end of a bell-crank lever, 26, which latter is fulcrumed or pivoted at, 89, to the upright, 2. The lower end of the bell-crank lever, 26, is provided with a pin or roller, 64, that enters a groove, 83, in the side of a cam, 27,—the cam being mounted on a horizontal main shaft, 93. It is obvious that as cam, 27, turns, it causes the bell crank lever, 26, to oscillate and the upper end of said lever imparts a reciprocating movement to the rack-bar, 43, which rocks the shafts, 44, and, 57, and consequently swings the transfer tables, 11, and, 95, so as to bring them into register with either the upper or lower tracks which are to sustain the peg plates.

By referring to Figs. 13 and 14 of the drawings, it will be seen that the peg plates, 84, carry a plurality of pegs, 85. These pegs are arranged in rows. The plates are of a width that will enable them to be sustained in a horizontal position on the upper tracks, 7, and the lower tracks, 38, as seen in Fig. 3. The pegs are provided with a contracted portion, 119, for a purpose during the operation of stripping the capsules therefrom as will presently appear.

It is to be understood that both the upper tracks, 7, and the lower tracks, 38, will sustain as many peg plates as their lengths will permit but each plate will be separate and independent from all the other plates. By again referring to Fig. 3, it will be noted that the pegs on those plates that are sustained by the upper tracks, 7, all project vertically above the plates which carry them, while the pegs of the plates on the lower tracks, 38, depend vertically below said plates. This reversal of the pegs is effected at the rear end of the tracks when the transfer table, 95, receives a plate and reverses it as it carries it down and brings it into edgewise registration with the lower tracks, 38.

It will thus be seen that each time the rack-bar, 43, is reciprocated in one direction it will swing the transfer table, 11, up to upper tracks, 7, with a peg plate in place and will swing transfer table, 95, up empty so as to receive a peg plate that is ejected at the rear to make room for the plate that is inserted at the front end. When the rack-bar, 43, is reciprocated in a reverse direction the transfer table, 95, at the rear will be lowered into registration with the lower tracks, 38, thus carrying a peg-plate down to said lower tracks, while the table, 11, at the front end will be returned empty to a position where it can receive a peg plate at the front end of the lower track when the peg plate just previously carried to the rear end is moved horizontally thereon. This horizontal movement of the peg plates onto the rear end of lower tracks, 38, is effected by means of a feed bar, 37, (see Fig. 1$^c$) that has a hook, 56, at its rear end to engage the peg plate and draw it from the transfer table, 95, onto the lower tracks. The forward end of the feed bar is connected to a rock arm, 90, that is pivotally mounted on a shaft, 60, and which has an arm, 83, that is actuated by a cam, 94, on the main shaft, 93. It is thus to be understood that as cam, 94, draws bar, 37, forward the hook, 56, will engage the peg plate on the transfer table, 95, and not only push it onto the rear ends of the lower tracks, but will also effect a forward movement of all the peg plates on the said lower track and push the foremost plate off the front ends of the tracks onto the transfer table, 11, at the front end.

It has been pointed out that the plates on the lower track 38, are sustained horizontally with the pegs depending therefrom and it will thus be understood that when the foremost peg plate is pushed into engagement with the front transfer table, 11, that the pegs of that plate still depend, as shown in Fig. 1$^A$, of the drawing.

When the peg plates are pushed onto the table, 11, the depending pegs are clean and are ready to be coated with gelatin,—the pegs thus forming a mold to shape the gelatin during the hardening thereof. The devices for coating the pegs will therefore now be described, particular reference being made to Figs. 1 and 1$^A$ of the drawings. By reference to said figures it will be noted that a long lever, 34, is pivotally mounted at, 59, to the upright, 5, near the rear of the machine and said lever extends forwardly in substantially a horizontal direction until it passes over the cams on the main shaft, 93, the lever then inclines downwardly for a short distance as at, 194, and then again extends in substantially a horizontal direction and terminates in an upright or vertically-projecting end, 42, at the front of the machine. The vertical end, 42, of the lever, 34, sustains a horizontal receptacle, 24, which contains water or is provided with suitable means for heating an inner receptacle, 23, which latter contains the gelatin in a fluid state. It will be noted that the receptacles, 24, and, 23, have a position directly beneath the depending pegs, 85, on the peg-plate that is held in the transfer table, 11, so that the bringing together of the pegs and gelatin, by the movement of one toward the other will result in coating the depending ends of the pegs with the fluid gelatin. In the present instance devices are employed to cause the gelatin receptacle to be moved toward the pegs and consists of a rock-shaft, 22, having a rock-arm, 115, on its outer end. This arm has a position adjacent the horizontal portion of lever, 34, and directly beneath a bell-crank lever, 63, which is carried on the lever, 34, so that when the shaft, 22, is rocked the arm will swing and thus lift the levers, 63, and, 34, thereby raising receptacles 24, and, 23, until the pegs are dipped a sufficient depth into the gelatin and coated. To rock the shaft, 22, the inner end of the latter is provided with a depending arm, 46, as shown in broken lines in Fig. 1A, and the lower end of this arm pivotally engages the forward end of a substantially horizontal link-bar, 29. The rear end of this link bar, 29, is pivoted at, 48, to the lower free end of a cam rocker, 32, which latter hangs pendantly from a suitable pivot, 60, on the upright, 4. By closely examining Fig. 1A, it will be noted that the cam rocker, 32, has a slight projection at one side which carries a pin or roller, 49, and that said pin or roller bears against the circumferential edge or face of a cam, 91, which is carried on the main shaft, 93.

From the above description it will be noted that at each revolution of cam, 91, the rocker, 32, will be swung laterally away from the cam and that the lower end of said rocker will move the link bar, 29, in a rearward direction,—drawing the lower end of rock arm, 46, with it, rocking the shaft, 22, and raising the arm, 115, which elevates the levers, 63, and, 34, and the receptacles, 24, and, 23. Immediately after this operation the rack-bar, 43, will be reciprocated and the transfer table, 11, will be turned with shaft, 44, so as to elevate the peg plate at that time in the table and reverse the coated pegs from a pendant position to a position where they will project above the plate which carries them. This reversal of the coated pegs carries the surplus gelatin on the pegs to drain toward the peg plate instead of accumulating at the end and by this reversal the coating on the upper ends of the pegs will become of a uniform thickness. This coating of pegs and the transferral of the pegs and plates carrying them is continuously going on and as a plate with freshly-coated pegs is swung up from the gelatin and pushed onto the front end of the upper track, a plate at the rear end of said track is lowered onto the lower track at the rear end of the machine. In the practical operation of the machine it has been found that a sort of scum collects on the surface of the liquid gelatin which would interfere with the proper coating of the pegs when the latter are dipped, it is therefore desirable that an automatic skimming of the surface of the fluid gelatin take place before the pegs are dipped. This is provided for by the devices particularly shown in Fig. 5, of the drawing to which attention is now directed.

On the main shaft, 93, there is mounted a cam, 113, and at one side of said cam there is carried a rock lever, 107,—the latter being pivoted at its lower end to a suitable bracket, 120, and said pivoted end carrying an arm, 131, which engages cam, 113.

The upper end of lever, 107, is pivotally connected at, 106, to the rear end of a reciprocable skimmer bar, 105, and the forward end of this bar carries a paddle, 104, that extends into the gelatin receptacle, 23. A bell-crank lever, 103, is pivotally mounted at, 98, at the side of the receptacle, 24, and one arm of this lever projects beneath the skimmer bar while the other arm of said lever is pivotally connected to the forward end of a rod, 108, whose rear end is pivoted at, 129, to the upper end of a rocker bar, 109. This rocker bar has its lower end pivotally connected to the bracket, 120, and the pivoted end carries an arm, 132, that engages cam, 112, which intermittently rocks the bar and draws on rod, 108, to rock the bell-crank, 103. A suitable spring, 130, serves to yieldingly draw the upper ends of the lever, 107, and rocker bar, 109, toward each other as the cams, 113, and, 112, release them. From the above description it is to be understood that bar, 107, will cause the skimmer paddle to be moved back and forth on the surface of the gelatin while bell-crank, 103, will lift the skimmer paddle as it makes one of its cross-wise movements,—thus always skimming or drawing the scum to one side of the gelatin receptacle.

The repeated dipping of the pegs into the gelatin obviously gradually consumes the gelatin and unless some means be provided to increase the upward stroke of the end, 42, of bar, 34, the depth of the dip of the pegs in the gelatin will quickly decrease and become insufficient. To avoid this, mechanism is provided to gradually increase the throw of the lever, 34, and thereby raise the gelatin receptacle at intervals more and more, until the gelatin is practically all consumed. The mechanism for accomplishing this is illustrated in Figs. 1 and 1A, and will now be described.

A bell-crank lever, 63, is pivoted at, 74, to the side of the lifting lever, 34, which raises and lowers the gelatin receptacle and one arm of this bell-crank lever rests upon the upper surface of rock-arm, 115, while the other arm of said bell-crank lever depends below said lifting lever, 34, and is pivotally connected at, 76, to the forward end of a ratchet bar, 78. This ratchet bar has teeth on its upper surface and at the rear end and said teeth are engaged by a pawl, 137, which is carried on the lower end of a ratchet lever, 79. This ratchet lever is pivoted at, 60, and has an arm, 138, which projects at one side and contacts with the circumferential face of a cam, 139, on the main shaft, 93. A pin or other suitable support, 140, on the upright, 4, serves to hold the rear end of the ratchet-bar, 78, up into engagement with the pawl, 137, and a pawl, 80, on the lower end of upright, 3, serves to prevent the return of ratchet bar, 78, when the pawl, 137, is returned to engage another tooth.

From the foregoing description it is to be understood that as cam, 139, makes a revolution the arm, 138, of lever, 79, will be moved laterally carrying the pawl, 137, on the lower end of said lever, 79, and thus drawing the bar, 78, rearwardly one tooth. This slight rearward movement of the bar, 78, will cause the upper arm of the bell-crank lever, 63, to move slightly downward and as said bell-crank lever is pivoted to lifting bar, 34, and the locking pawl, 80, will prevent the bar, 78, from returning, the lowered position of the lifting bar, 34, will be varied at each stroke or in other words when lowered on one stroke the bar, 34, will have a position slightly higher than it had on the last preceding stroke. The total movement of the bar, 34, however will be the same because the arm, 115, will always swing the same distance and the result is that each time the gelatin receptacle is raised it will stop at a point slightly higher than it did on the last stroke.

In practice the upper and lower tracks of the machine which sustain the endless series of peg plates are inclosed, except at certain points, to which reference will hereinafter be made, and the object of so inclosing the tracks is to enable the coating of gelatin on the pegs to be maintained in an atmosphere at proper temperature,—the air passing through a blower, 135, and by pipe, 111, to the coated pegs. If it is desired to raise the temperature of the air the latter is passed through an air intake device, 110, in which a suitable burner is placed. These features are shown diagrammatically in the drawings in Figs. 1 and 1ᴅ, and they operate to effect a proper hardening of the gelatin during the travel of the peg plates on the upper track so that after they have been delivered onto the lower track they will be sufficiently hard or set to enable them to be stripped from the pegs, as will now be described.

By referring particularly to Fig. 1ᴮ of the drawing it will be noted that the lower track, on which the peg plates with the hardened or set gelatin coating on the pegs are returned, is interrupted and at that point a short movable track section 140, is interposed. This short track section is carried on the forward ends of lifting bars, 6, which latter extend substantially in a horizontal direction toward the rear of the machine and are pivoted at, 58, to the upright, 5. Under normal conditions the track-section, 140, has position in alinement with the lower tracks, 38, so that the peg plate immediately at the rear may be moved thereon. After a peg plate has been moved onto said track section the latter is lowered through the action of a cam, 28, on main shaft, 93, which cam allows a lever, 61, that is pivoted at, 89, to swing rearwardly and pull down a link bar, 73, which is pivoted at, 77, to said lever, 61. The upper end of link-bar, 73, is pivotally connected to one arm of a crank shaft, 72,—the other arms of said crank shaft projecting beneath the lifting levers, 6, which sustain and lower the track section and the peg plate thereon.

Beneath the track section, 140, there is provided a horizontal guide plate, 12—the latter having a series or rows of perforations, 141, so arranged as to receive the depending pegs on which the capsules, which are now sufficiently hard or set to be removed. The pegs and capsules thereon are therefore passed through said perforations, 141, in the guide plate, 12, so as to depend below the under side of the guide plate. By referring to Figs. 3, 9 and 10, of the drawings it will be noted that the horizontal guide plate, 12, is a part of a frame having vertical side walls, 142, the latter extending down to a horizontal platform, 143.

A horizontal shaft, 121, extends through the machine from one side to the other,—passing through openings or bearings in the walls, 142, of the guide-plate frame, and said shaft is provided with eccentrics, 62, which are rigid with the shaft and which turn in elongated openings or slots, 144, in the vertical side walls, 86, of a lifting table. This lifting table has position between the walls, 142, of the guide plate frame, and is provided with a horizontal top, 114, with a series of vertically-extending perforations, 145, which form a lower guide for the depending capsule-covered pegs that have been projected through the perforations, 141, in the upper guide plate.

At the under side of plate, 114, the lifting table carries pinch plates, 25, as seen best in Figs. 6, 7, 8 and 9, of the drawings. These pinch plates are provided along the rear edge with a crosswise groove, 146, and between said groove and the opposite edge, is also provided with a series or rows of perforations. By referring particularly to Fig. 6, it will be noted that each perforation has an enlarged circular portion, 116, a smaller circular portion, 117, and a contracted portion, 118, at a point which separates the larger from the smaller circular portions. It will be recalled that the pegs, 85, have heretofore been described as having a reduced annular portion, 119, and it will be understood when it is now pointed out that when the pegs and capsules thereon are passed through the guide perforations, 141, and, 145, their lower ends are also passed through the larger circular portions, 116, of the pinch plates which receives them freely. After the pegs with the capsules thereon have been inserted in the large circular portions, 116, of the pinch plates the latter are moved laterally so as to pass the pegs and capsules thereon into the smaller circular portions, 117, where they will fit snugly. To do this, the location of the annular reduced portion, 119, of the pegs is such that said reduced portions will be in line with the contracted portions, 118, of the pinch plates, consequently the pegs and capsules thereon will pass laterally through the contracted portions, 118, and will then snugly fit the smaller circular portions, 117.

The lateral movement of the pinch plates is effected as is best shown in Fig. 4, by a reciprocable rod, 68, which has its forward end engaging the groove, 146, of the pinch plate. The rear end of this rod is pivotally connected at, 67, to rock-arm, 92, which latter is carried on a rock-shaft, 50, which latter also carries an arm, 36, which is actuated by a cam, 87, on the main shaft, 93, to move rod, 68, in one direction. An arm, 30, is also carried on the rock-shaft, 50, and is actuated by a cam, 88, on the main shaft to move the rod, 68, in the other direction. It will thus be understood that the movement of rod, 68, in one direction will cause the pinch plates to move so that the pegs and capsules will be engaged by the wall of the smaller circular portion, 117, while the movement of the rod in the other direction will reverse the movement of the pinch plate.

After the pinch plate has been removed so that the pegs and the capsules thereon are located in the smaller circular portion, 117, an operation of the eccentrics, 62, will cause the table, 86, to descend carrying the pinch plate with it. At this time the peg plates and pegs will be held stationary and the downward movement of the table and pinch plate will strip the capsules from the lower pendant ends of the pegs and crowd them into receivers, 69, as will presently be explained.

The devices that impart the vertical movement to the table and pinch plates are the eccentrics, 62, which turn with shaft, 121, and by reference to Figs 1, 1$^B$ and 3, of the drawings, it will be noted that a shaft, 45, extends horizontally through the machine and is provided at one end with a driving pulley, 147, and at the other end carries a pinion, 20. This pinion meshes with a gear, 17, on a short shaft, 70, which latter shaft also carries a pinion, 97, that meshes with and drives a gear, 18, on the eccentric shaft, 121. It will thus be seen that the vertical movement of the table, 86, and pinch plates to strip the capsules from the pegs is effected through the gearing from shaft, 45.

When the pegs with the capsules thereon are inserted in the perforations, 141, 145, and, 118, the lower ends of the pegs will have position directly over a capsule receiver, 69. The receiver is sustained on suitable brackets, 148, that are rigidly secured to the inner sides of the walls, 142, of the table frame and project through slots, 149, in said walls, 142, so the table may move vertically irrespective of the brackets. The receivers are portable so that when one has received the capsules from a series of pegs, it may be removed and another substituted.

The receiver is shown in Figs. 8, 9, 10 and 11 of the drawings and comprises a lower receptacle portion, 150, having a plurality of cavities, 151, and also having an outer plate, 126, that is movable with respect to the receptacle portion by means of a hinge, 152. Between the movable outer plate, 126, and the receptacle portion, 150, the receiver is provided with interposed movable clamping plates, 127, and, 128, respectively. The outer plate, 126, has a series of perforations, 153; the interposed movable plate, 127, has a series of perforations, 155, and the other movable plate, 128, is provided with a series of perforations, 156, all shown in Fig. 11 of the drawing It will also be noted in said Fig. 11, that a slot, 154, is provided in the receptacle portion, 150, which slot extends from one side edge across all of the cavities. This slot is utilized in another step of the process of manufacture during the cutting of the capsules into proper lengths and is therefore only briefly referred to herein. By again referring to Figs. 10 and 11 it will be noted that a rotatable head, 157, has bearing in the outer plate, 126, and also in the plate, 158, next to the receptacle portion, and that said head has cam faces, 159, and, 160, which turn in suitably-shaped openings in the interposed plates, 127, and, 128; so that when said head is turned the said interposed plates will be moved slightly in opposite directions and thus effect a partial closure of the perforations to clamp the capsules. It will be understood that as the table, 86, descends in the operation of stripping the capsules from the pegs that said capsules will be forced from the said pegs into the perforations, 153, 155, and, 156, and the closed ends of said stripped capsules will enter the cavities, 151, in the receptacle portion. Upon the completion of this operation the movable track section, 140, will raise the peg plate from the pegs of which the capsules have just been stripped and said peg plate will then be moved to a cleaning device where the pegs are to be cleaned. In the meantime the portable receiver will be removed from the brackets, 148, and another receiver substituted. After the capsules have been forced into the portable receiver the rotatable head, 157, will be turned sufficiently, in the present instance by the aid of the lever, 161, and thus cause the plates, 127, and, 128, to shift sufficiently in opposite directions to effectually clamp the capsules. The receiver is then so manipulated as to cause a suitable cutter to operate through slot, 154, and thereby cut the ragged upper ends from and leave the closed end of the capsules the proper length. One other operation is desirable before the pegs from which the capsules have been removed are again coated and that is the cleaning of the pegs before dipping.

By referring to Figs. 1, 1<sup>B</sup>, 2 and 12, it will be noted that a horizontal shaft, 162, has bearing in the side plates, 163, at the front end of the machine and that one end of said shaft carries a driving pulley, 102. This shaft carries spaced-apart eccentrics, 101, which turn in suitable openings or slots, 164, in the vertical side walls, 165, of a peg-cleaning table, 122. This table has an upper horizontal plate, 122, with rows of perforations therein and a lower plate, 124, between which is placed a cleaning felt, 123. The felt and lower plate also have rows of registering perforations which aline with the perforations in the table or plate, 122. After the peg plates leave the movable track section, 140, they pause over the cleaning table and while thus stationary the shaft, 162, will turn eccentrics, 101, and cause the table to be vertically reciprocated thus bringing the perforations in plate, 122, felt, 123, and plate, 124, into registration with the depending pegs and by moving onto and off the pendant ends of said pegs effect a cleaning and polishing of the pegs to put them in condition to receive a fresh coating of gelatin when they are next dropped into the gelatin receptacle. At the front end of the lower track there is provided a system of pipes, 133, 134, and, 136, which direct air about the peg plates and pegs and effect a cooling of the latter to enable them to retain the fluid gelatin into which they are again dipped after they are pushed onto the front transfer as heretofore described.

From the above description it is to be understood that the practically endless series of plates with the pegs thereon are so arranged and manipulated that the pegs are dipped into and thus coated with gelatin; are then reversed and moved along upper tracks where the gelatin cools and sets; are then lowered onto lower tracks where the set capsules are stripped into portable receivers; the pegs are then cleaned and cooled and the operation repeated. It will also be understood that the movement of the peg-plates is an intermittent one so that at the moments of rest the pegs on one plate will be dipped; another set of pegs will be stripped; another set will at the same time be cleaned and another set be cooled, and the other sets of pegs with the capsules thereon will be simply utilizing the intervening periods to effect a cooling and hardening of the gelatin.

Suitable driving pulleys, 31, and, 96, are mounted on the main driving shaft, 93, for the obvious purposes of controlling the operation of the machine.

Having thus described my invention what I claim and desire to secure by Letters Patent is—

1. In a machine for forming capsules the combination with an upper horizontal track of a lower horizontal track; a series of separate and independent plates sustained on the upper track; a series of separate and independent plates sustained on the lower track; means at one end of the tracks for elevating the independent plates one at a time from the lower to the upper track; means at the other end of the tracks for lowering one plate at a time from the upper to the lower track; pegs carried by each separate and independent plate; means for coating the pegs on one plate at a time with gelatin and means between the opposite ends of the tracks for removing the gelatin coating from the pegs in the form of capsule parts.

2. In a capsule machine the combination with spaced-apart upper and lower tracks of a series of disconnected and separate peg plates on both tracks; pegs carried by said peg plates; means for coating the pegs with gelatin; means at each end of the tracks for transferring the peg-plates one at a time from one track to the other; a portable receiver having a plurality of perforations and means for stripping the gelatin coatings simultaneously from all the pegs of a plate and forcing them into the perforations of the said portable receiver.

3. In a capsule machine the combination with upper and lower horizontal tracks, of a series of disconnected plates supported by and movable on said tracks; pegs carried by each plate; a vertically movable table adjacent to the lower tracks and said table having perforations to receive the coated pegs of one plate at a time; a pinch plate carried by said table to engage and strip the capsule coatings from the pegs; a transfer device at each end of the two sets of tracks to lower the plates from the upper to the lower track and to elevate the plates from the lower to the upper track and means for coating the pegs on one plate at a time.

4. In a capsule machine the combination with an upper horizontal track, of a lower horizontal track; a transfer device at each end of said upper and lower tracks; means for operating said transfer devices to intermittently cause them to register with said upper and then said lower tracks; plates movable on said upper and lower tracks between the two transfer devices and each of said plates having a plurality of pegs; a gelatin container; means for bringing the gelatin in the container and the pegs on one plate after another into contact to coat the pegs; means movable toward and from the lower track to engage the capsule coatings on all the pegs of the plates in succession and strip them from the pegs and a portable receiver to receive the stripped capsule coatings and hold them in a separated condition.

5. In a capsule machine the combination with an upper horizontal track, of a lower horizontal track; a transfer device at each end of said upper and lower tracks; means for operating said transfer devices to intermittently cause them to register with said upper and then said lower tracks; plates movable on said upper and lower tracks between the two transfer devices and each of said plates having a plurality of pegs; a gelatin container; means for bringing the gelatin in the container and the pegs on one plate after another into contact to coat the pegs; means movable toward and from the lower track to engage the capsule coatings on all the pegs of the plates in succession and strip them from the pegs; a portable receiver to receive the stripped capsules and hold them in a separated condition and means also adjacent to the lower track for cleaning the pegs of each plate after the capsules have been stripped therefrom.

BENJAMIN THOMAS WINCHESTER.

Witnesses:
WILLIAM W. VARNEY,
RAYMOND H. WHITING,

Copies of this patent may be obtained for five cents each, by addressing the "Commissioner of Patents, Washington, D. C."